(12) United States Patent
Coutts et al.

(10) Patent No.: US 12,475,126 B1
(45) Date of Patent: Nov. 18, 2025

(54) DEPARTMENTAL ALLOCATION OF QUERY PROCESSING

(71) Applicant: Teradata US, Inc, San Diego, CA (US)

(72) Inventors: Michael G. Coutts, San Diego, CA (US); Douglas P. Brown, Rancho Santa Fe, CA (US); David Doyle Gilbreath, Escondido, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/902,262

(22) Filed: Sep. 30, 2024

(51) Int. Cl.
*G06F 15/16* (2006.01)
*G06F 16/2453* (2019.01)

(52) U.S. Cl.
CPC .............................. *G06F 16/24545* (2019.01)

(58) Field of Classification Search
None
See application file for complete search history.

(56) References Cited

U.S. PATENT DOCUMENTS

| | | | |
|---|---|---|---|
| 9,805,121 B2 | 10/2017 | Brown et al. | |
| 2005/0278276 A1* | 12/2005 | Andreev | G06F 16/24575 |
| 2020/0341981 A1* | 10/2020 | Fender | G06F 16/24544 |
| 2024/0220498 A1* | 7/2024 | Taft | G06F 16/24542 |

* cited by examiner

*Primary Examiner* — Alex Gofman
(74) *Attorney, Agent, or Firm* — Howard Speight

(57) ABSTRACT

A database system analyzes a query to determine the resources required to execute the query by identifying the department that issued the query (the "source department") and identifying query-recited tables and determining the department by which each of the query-recited tables is controlled (the "accessed departments"). The database system determines that the resources required to execute the query are controlled by more than one department: the source department and one or more accessed departments. For each accessed department, a cost of a first strategy involving a SQL rewrite and a cost of a second strategy not involving a SQL rewrite are determined by preparing a query execution plan, determining the cost of the resources, and considering whether data controlled by the accessed department is not accessible except to the accessed department. The first strategy is chosen for at least one of the accessed departments because the first-strategy cost is lower.

20 Claims, 7 Drawing Sheets

DEPARTMENTAL ALLOCATION OF QUERY PROCESSING

BACKGROUND

Modern Cloud-Based Enterprise Data Warehouses (CBEDW) provide an environment within which all a company's data may be contained, managed, analyzed, and presented to the members of the business. As Enterprise Applications (EAs) increasingly utilize the contents of the database, through online web access for human interaction and web services access for business-to-business interaction, the load on the CBEDW will increase.

A major issue with the CBEDW is the need to prioritize and partition access to the limited resources, i.e., data capacity and data processing capability, of the environment. Where multiple EAs co-exist upon a single CBEDW there is always conflict for the available resources of the CBEDW. These conflicts may be addressed by partitioning processing capability between the different business groups (or departments) of the organization that own the individual EAs. Each department contributes to cover the cost of the CBEDW and is apportioned an appropriate amount of the data capacity and data processing capability of the CBEDW.

This is fine where EAs exist as separate entities on top of a single CBEDW; each EA is responsible for its own use of the CBEDW and the associated costs thereof. Workload management may be employed to control access to specific amounts of resources or capacity to queries issued by the different applications owned and managed by different departments according to their apportioned capacity.

However, in a modern CBEDW, the potential emerges for a complex query issued by one department to need access to data "owned" by a different department.

It is a challenge to provide one department in an enterprise access to data owned by another department in that enterprise in a CBEDW having data capacity and data processing capability partitioned by department.

SUMMARY

In one aspect, a method includes executing, by a plurality of compute groups, a cloud based enterprise data warehouse (CBEDW) for an enterprise as a plurality of processes. At least one of the compute groups is cloud based. Each compute group includes one or more compute clusters, including a primary compute cluster and a plurality of secondary compute clusters. Each compute cluster includes one or more nodes. Each node includes at least one computer processor and a memory. The plurality of processes stores data on a data storage. At least a portion of the data storage is cloud based. The enterprise includes a plurality of departments. At least some of the plurality of departments has control of a respective one or more the plurality of secondary compute clusters. The data storage is segmented into departmental portions and wherein at least some of the plurality of departments that have control of one or more of the plurality of secondary compute clusters has control of a respective departmental portion of the data storage. The method includes executing, by at least one of the plurality of processes, a database system. The method includes receiving a query by the database system. The query recites one or more query-recited tables. Each of the query-recited tables is stored in a respective departmental portion of the data storage. The method includes analyzing the query by the database system to determine the resources required to execute the query by identifying the department that issued the query (the "source department") and identifying the one or more secondary compute clusters controlled by the source department as a resource required to execute the query, identifying the query-recited tables and determining the department by which each of the query-recited tables is controlled by accessing a database-level data dictionary that identifies tables in the database system, which department controls each table, and which departments have access to each table, identifying the departmental portion of the data storage for each department that controls a query-recited table as a resource required to execute the query, and identifying the secondary compute clusters controlled by each department that controls a query-recited table as a resource required to execute the query. The method includes determining, by the database system, that the resources required to execute the query are controlled by more than one department: the source department and one or more accessed departments. The method includes for each accessed department: determining, by the database system, a first-strategy cost of a first strategy for processing the accessed department's portion of the query, wherein in the first strategy the query is re-written to have an accessed-department sub-query to be performed using the resources controlled by the accessed department to produce an accessed-department intermediate result set and a source-department sub-query to be performed using the resources controlled by the source department to incorporate the accessed-department intermediate result into a query result set, and determining, by the database system, a second-strategy cost of a second strategy for processing the accessed department's portion of the query, wherein in the second strategy the query is executed by the one or more secondary compute clusters controlled by the source department to produce the query result set. Determining the cost includes: preparing, by the database system, a query execution plan, determining the cost of the resources, and considering whether data controlled by the accessed department is not accessible except to the accessed department. The method includes for at least one of the accessed departments, choosing, by the database system, the first strategy because the first-strategy cost is lower than the second-strategy cost, and for the accessed departments for which the first strategy was chosen, processing a portion of the query to be performed using resources controlled by the accessed department using the chosen first strategy to produce the accessed-department intermediate result set. The method includes processing the query, by the secondary compute cluster controlled by the source department, the query incorporating the one or more accessed-department intermediate result sets from the one or more accessed departments, to produce a result set.

In one aspect, a non-transitory computer-readable tangible medium has recorded on it a computer program. The computer program includes executable instructions, that, when executed, perform a method. The method includes executing, by a plurality of compute groups, a cloud based enterprise data warehouse (CBEDW) for an enterprise as a plurality of processes. At least one of the compute groups is cloud based. Each compute group includes one or more compute clusters, including a primary compute cluster and a plurality of secondary compute clusters. Each compute cluster includes one or more nodes. Each node includes at least one computer processor and a memory. The plurality of processes stores data on a data storage. At least a portion of the data storage is cloud based. The enterprise includes a plurality of departments. At least some of the plurality of departments has control of a respective one or more the plurality of secondary compute clusters. The data storage is segmented into departmental portions and wherein at least some of the plurality of departments that have control of one or more of the plurality of secondary compute clusters has control of a respective departmental portion of the data storage. The method includes executing, by at least one of the plurality of processes, a database system. The method includes receiving a query by the database system. The query recites one or more query-recited tables. Each of the query-recited tables is stored in a respective departmental portion of the data storage. The method includes analyzing the query by the database system to determine the resources required to execute the query by identifying the department that issued the query (the "source department") and identifying the one or more secondary compute clusters controlled by the source department as a resource required to execute the query, identifying the query-recited tables and determining the department by which each of the query-recited tables is controlled by accessing a database-level data dictionary that identifies tables in the database system, which department controls each table, and which departments have access to each table, identifying the departmental portion of the data storage for each department that controls a query-recited table as a resource required to execute the query, and identifying the secondary compute clusters controlled by each department that controls a query-recited table as a resource required to execute the query. The method includes determining, by the database system, that the resources required to execute the query are controlled by more than one department: the source department and one or more accessed departments. The method includes for each accessed department: determining, by the database system, a first-strategy cost of a first strategy for processing the accessed department's portion of the query, wherein in the first strategy the query is re-written to have an accessed-department sub-query to be performed using the resources controlled by the accessed department to produce an accessed-department intermediate result set and a source-department sub-query to be performed using the resources controlled by the source department to incorporate the accessed-department intermediate result into a query result set, and determining, by the database system, a second-strategy cost of a second strategy for processing the accessed department's portion of the query, wherein in the second strategy the query is executed by the one or more secondary compute clusters controlled by the source department to produce the query result set. Determining the cost includes: preparing, by the database system, a query execution plan, determining the cost of the resources, and considering whether data controlled by the accessed department is not accessible except to the accessed department. The method includes for at least one of the accessed departments, choosing, by the database system, the first strategy because the first-strategy cost is lower than the second-strategy cost, and for the accessed departments for which the first strategy was chosen, processing a portion of the query to be performed using resources controlled by the accessed department using the chosen first strategy to produce the accessed-department intermediate result set. The method includes processing the query, by the secondary compute cluster controlled by the source department, the query incorporating the one or more accessed-department intermediate result sets from the one or more accessed departments, to produce a result set.

In one aspect, a system includes a plurality of compute groups executing a cloud based enterprise data warehouse (CBEDW) for an enterprise as a plurality of processes. At least one of the compute groups is cloud based. Each compute group includes one or more compute clusters, including a primary compute cluster and a plurality of secondary compute clusters. Each compute cluster includes one or more nodes. Each node includes at least one computer processor and a memory. The plurality of processes stores data on a data storage. At least a portion of the data storage is cloud based. The enterprise includes a plurality of departments. At least some of the plurality of departments has control of a respective one or more the plurality of secondary compute clusters. The data storage is segmented into departmental portions. At least some of the plurality of departments that have control of one or more of the plurality of secondary compute clusters has control of a respective departmental portion of the data storage. The CBEDW executes, by at least one of the plurality of processes, a database system. The database system receives a query. The query recites one or more query-recited tables. Each of the query-recited tables is stored in a respective departmental portion of the data storage. The database system analyzing the query to determine the resources required to execute the query by identifying the department that issued the query (the "source department") and identifying the one or more secondary compute clusters controlled by the source department as a resource required to execute the query and identifying the query-recited tables and determining the department by which each of the query-recited tables is controlled by: accessing a database-level data dictionary that identifies tables in the database system, which department controls each table, and which departments have access to each table, identifying the departmental portion of the data storage for each department that controls a query-recited table as a resource required to execute the query, and identifying the secondary compute clusters controlled by each department that controls a query-recited table as a resource required to execute the query. The database system determines that the resources required to execute the query are controlled by more than one department: the source department and one or more accessed departments. For each accessed department the database system determining a first-strategy cost of a first strategy for processing the accessed department's portion of the query, wherein in the first strategy the query is re-written to have an accessed-department sub-query to be performed using the resources controlled by the accessed department to produce an accessed-department intermediate result set and a source-department sub-query to be performed using the resources controlled by the source department to incorporate the accessed-department intermediate result into a query result set, and the database system determining, a second-strategy cost of a second strategy for processing the accessed department's portion of the query, wherein in the second strategy the query is executed by the one or more secondary compute clusters controlled by the source department to produce the query result set. Determining the cost includes preparing, by the database system, a query execution plan, determining the cost of the resources, and considering whether data controlled by the accessed department is not accessible except to the accessed department. The database system choosing, for at least one of the accessed departments, the first strategy because the first-strategy cost is lower than the second-strategy cost. The database system processing, for the accessed departments for which the first strategy was chosen, a portion of the query to be performed using resources controlled by the accessed department using the chosen first strategy to produce the accessed-department intermediate result set. The secondary compute cluster controlled by the source department processing the query, incorporating the one or more accessed-department intermediate result sets from the one or more accessed departments, to produce a result set.

DETAILED DESCRIPTION (Note: This application references publications as indicated throughout the specification by one or more reference numbers within brackets [x]. A list of these publications ordered according to these reference numbers can be found below in the section entitled "References." The Reference section may also list some publications that are not explicitly referenced in this application. Each of these publications, including those that are not explicitly referenced, is incorporated by reference herein.)

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

An Example Computer System

Figure 1:
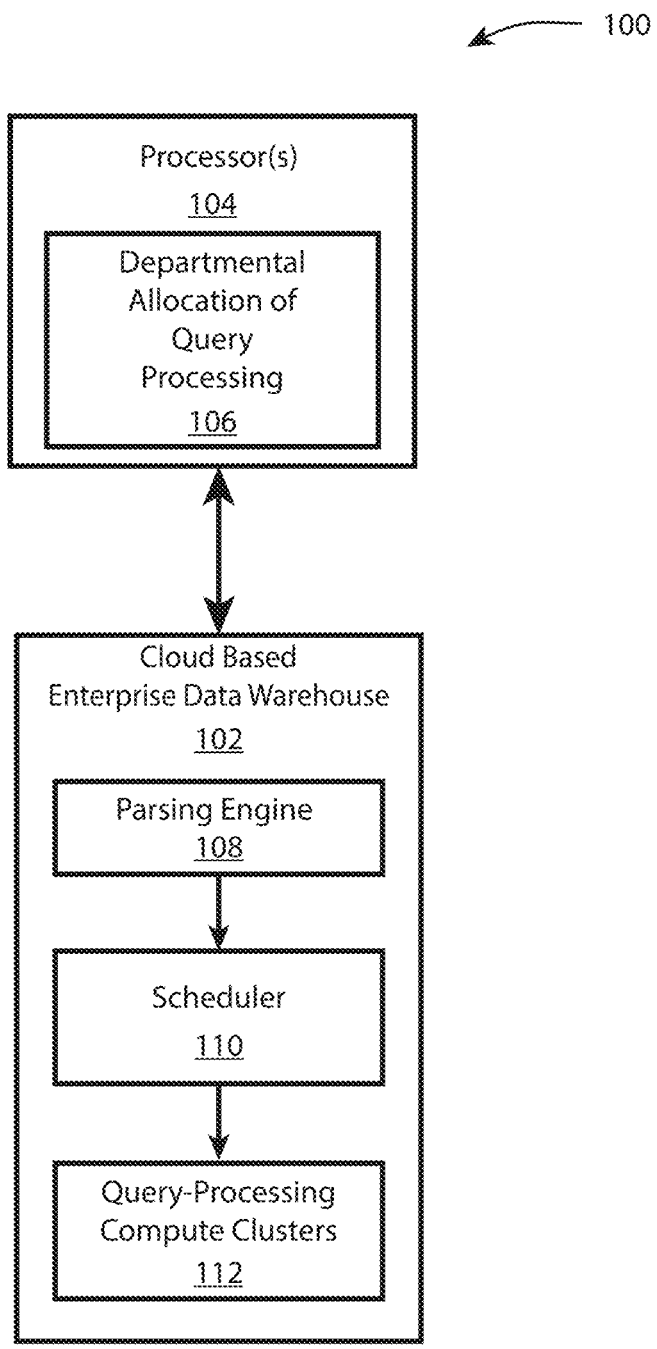
FIG. 1 is one example of a block diagram of a computer system.

The techniques disclosed herein have application to, but are not limited to, systems such as the system 100 illustrated in FIG. 1. The system 100 includes a variety of hardware components and software components that may be deployed on an appliance, on commodity hardware, in a private cloud, in a public cloud, in a combination of public and private clouds, and/or in a multi-cloud where cloud users are allowed services from multiple cloud vendors such as Amazon (AWS), Google (GC), Microsoft (Azure), etc. The software components are programmed as executable instructions into memory and/or a non-transitory computer-readable medium for execution on the hardware components (including, for example, hardware processors). System 100 includes one or more network connections; the networks can be wired, wireless, or a combination of wired and wireless.

The system 100 implements, among other things, the processing described below in connection with FIGS. 1-9.

An Example Database Management System

The system 100 includes a CBEDW 102, at least one hardware processor 104, and a non-transitory computer-readable storage medium having executable instructions representing techniques for departmental allocation of query processing 106, as disclosed herein. The CBEDW 102 may be a distributed data system, such as VantageCloud Lake™ offered by Teradata Corporation.

The CBEDW 102 may be a relational CBEDW (RCBEDW) or it may be another variety of database management system. The CBEDW 102 may include a parsing engine 108, discussed below in connection with FIGS. 2 and 3, that organizes the storage of data and the distribution of database table rows and coordinates the retrieval of data from the data-storage facilities in response to queries received from a user. The CBEDW 102 usually receives queries and commands to build tables in a standard format, such as Structured Query Language (SQL), or similar structured or unstructured languages including natural languages. The CBEDW 102 also includes a scheduler 110 that makes decisions about when (i.e., immediately or delayed) and where (i.e., which computer or set of computers) executable steps to process a query are to be executed. The CBEDW 102 also includes query-processing compute clusters 112, that process the query and produce a result. The compute clusters 112, described in more detail below, provide the ability to scale the CBEDW 102. In a data lake system, such as CBEDW 102, the data may not necessarily be managed by the same company that provides the primary compute cluster or the secondary compute clusters (discussed below), but the data can be anywhere and can be managed by anyone. The data can be processed as long as it is accessible via, for example, network or Internet connections.

Figure 2:
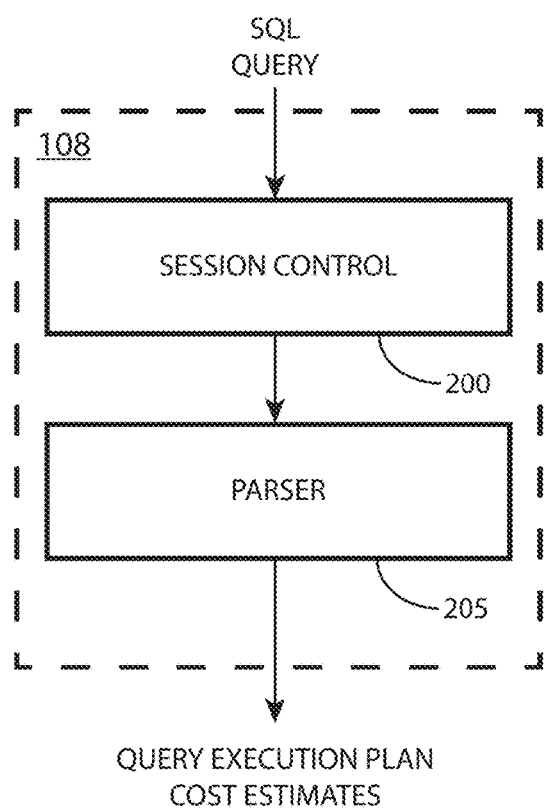
FIG. 2 is one example of a block diagram of a parsing engine.

The parsing engine, shown in FIG. 2, includes a session control 200 that allows a session to begin and a user to submit a SQL query. For the purposes of this document, the term "query" (or "request") refers to any statement, whether in SQL or a similar structured or unstructured language, that (1) causes data to be read from a database, such as CBEDW 102, including cases where that read may be part of a larger write statement, where that data may be processed by the CBEDW to produce an output result, and/or (2) instigates other CBEDW actions, such as load utilities to load data from a source to a target, etc., including any background tasks necessary to produce the output result. More broadly, the user may submit a "request," a term that includes database query, which is processed by the CBEDW to produce an output result, and other CBEDW actions, such as load utilities to load data from a source to a target, etc. Typically, a query includes one or more predicates. Query predicates, or logical predicates, are types of conditional expressions that specify a condition of a row or group of rows that has one of three possible states: TRUE, FALSE, or NULL (or unknown).

Figure 3:
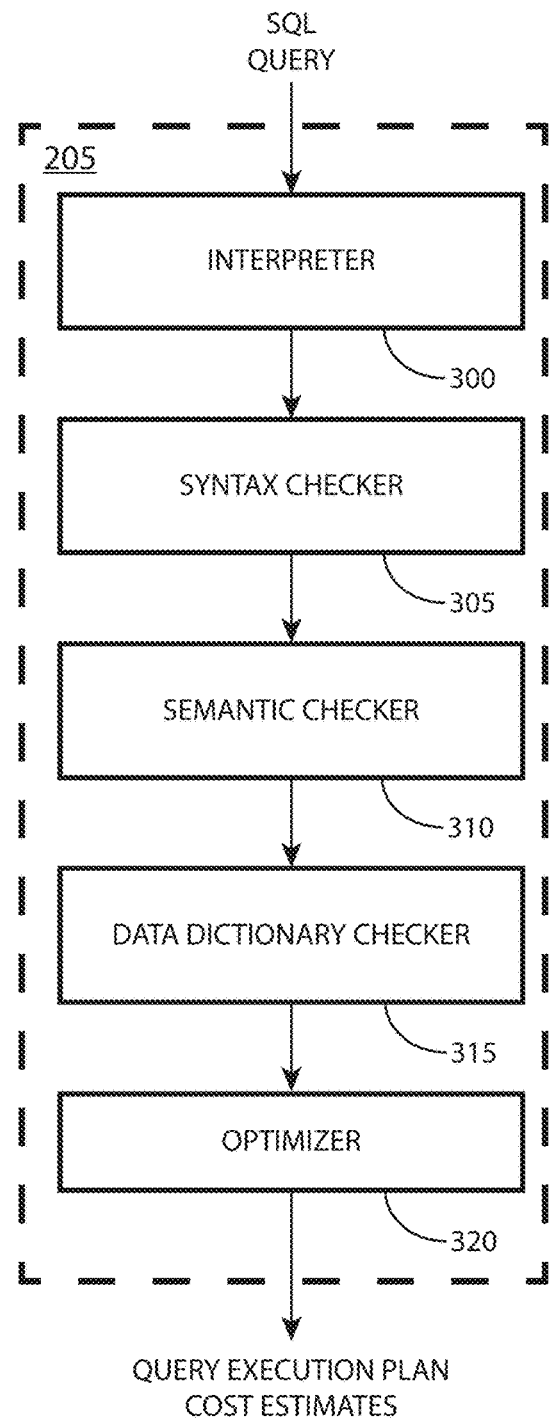
FIG. 3 is one example of a block diagram of a parser.

The SQL query is routed to the parser 205. As illustrated in FIG. 3, the parser 205 interprets the SQL query 300, checks it for proper SQL syntax 305, evaluates it semantically 310, and consults a data dictionary to ensure that all the objects specified in the SQL query actually exist and that the user has the authority to perform the request 315. Finally, the parser 205 runs an optimizer 320, which develops a query execution plan (QEP) to perform the query and produces cost estimates, where the term "cost" in this context has different dimensions, namely time, resource usage, and financial. The term "cost" in this disclosure may have additional dimensions, as discussed below, including whether some or all of the data has restrictions such as row-level locks or locks arising from licensing of user-defined functions.

Returning to FIG. 1, the scheduler 110 produces executable steps to process the query. These executable steps are sent to query-processing compute clusters 112 (compute clusters are discussed below) for execution.

A "workload group" (or alternatively "workload") is a set of requests that have common characteristics, such as an EA that issued the requests, a source of the requests, type of query, priority, response time goals, throughput, etc. A workload group is defined by a workload definition (WD), which defines characteristics of the workload group as well as various rules associated with the workload group.

"Query banding" allows users to attach metadata to queries.

An Example Cloud-Based Processing System

Figure 4:
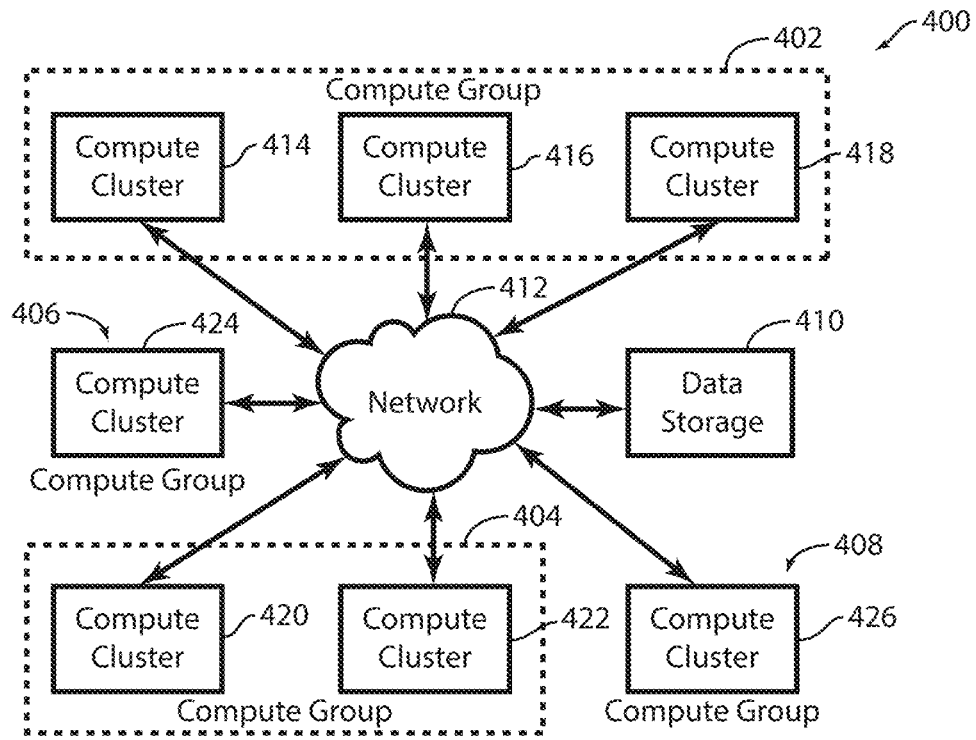
FIG. 4 illustrates a cloud-based processing system.

FIG. 4 illustrates a cloud-based processing system. A cloud-based processing system 400 includes one or more compute groups 402, 404, 406, 408 that communicate with a data storage 410 through a network 412. A compute group is defined as a collection of one or more compute clusters (discussed below in connection with FIG. 5). A compute group's usage may be designated for a particular department or EA of an enterprise. For example:
- compute group 402, which might be dedicated to the enterprise's Sales department, includes compute clusters 414, 416, and 418,
- compute group 404, which might be dedicated to the enterprise's market-research application, includes compute clusters 420 and 422,
- compute group 406, which might be dedicated to the enterprise's Security department, includes compute cluster 424, and
- compute group 408, which might be dedicated to the enterprise's Engineering department, includes compute cluster 426.

Alternatively, a compute group may be used by multiple departments within an enterprise or by multiple enterprises.

Data storage 410 may include cloud-based object storage, such as Amazon Simple Storage Service (S3) or the Azure Blob Storage, or it may be a data storage system local to the enterprise or a combination of local and cloud-based storage.

Figure 5:
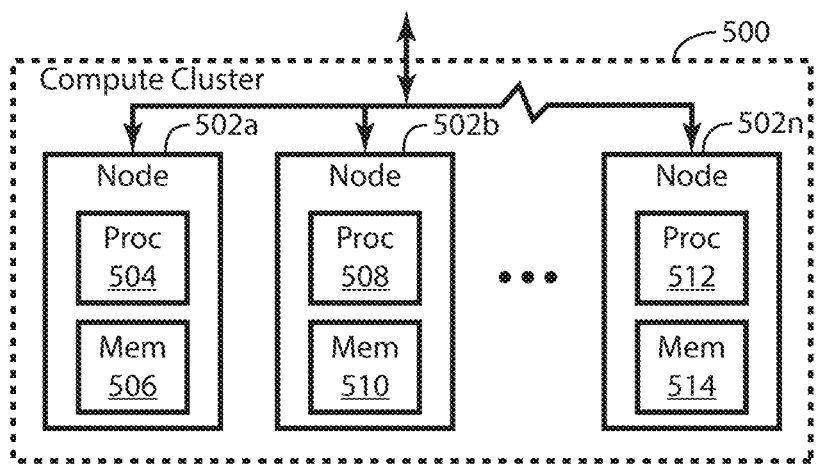
FIG. 5 illustrates a compute cluster.

FIG. 5 illustrates a compute cluster. A compute cluster 500 may be a complete full-featured database, such as that provided by Teradata Corporation, able to process queries. Each compute cluster 500 includes one or more nodes 502a, 502b, . . . , 502n. Each node includes a processor and memory. For example:
- node 502a includes processor 504 and memory 506,
- node 502b includes processor 508 and memory 510, and
- node 502n includes processor 512 and memory 514.

Each node 502a, 502b, . . . , 502n may be local to the enterprise or it may be cloud based. If cloud based, the processor and memory may be any of the processor/memory configurations offered by the cloud provider.

Compute groups, compute clusters, nodes, and processors are all "compute capacities."

Example CBEDW Architecture

Figure 6:
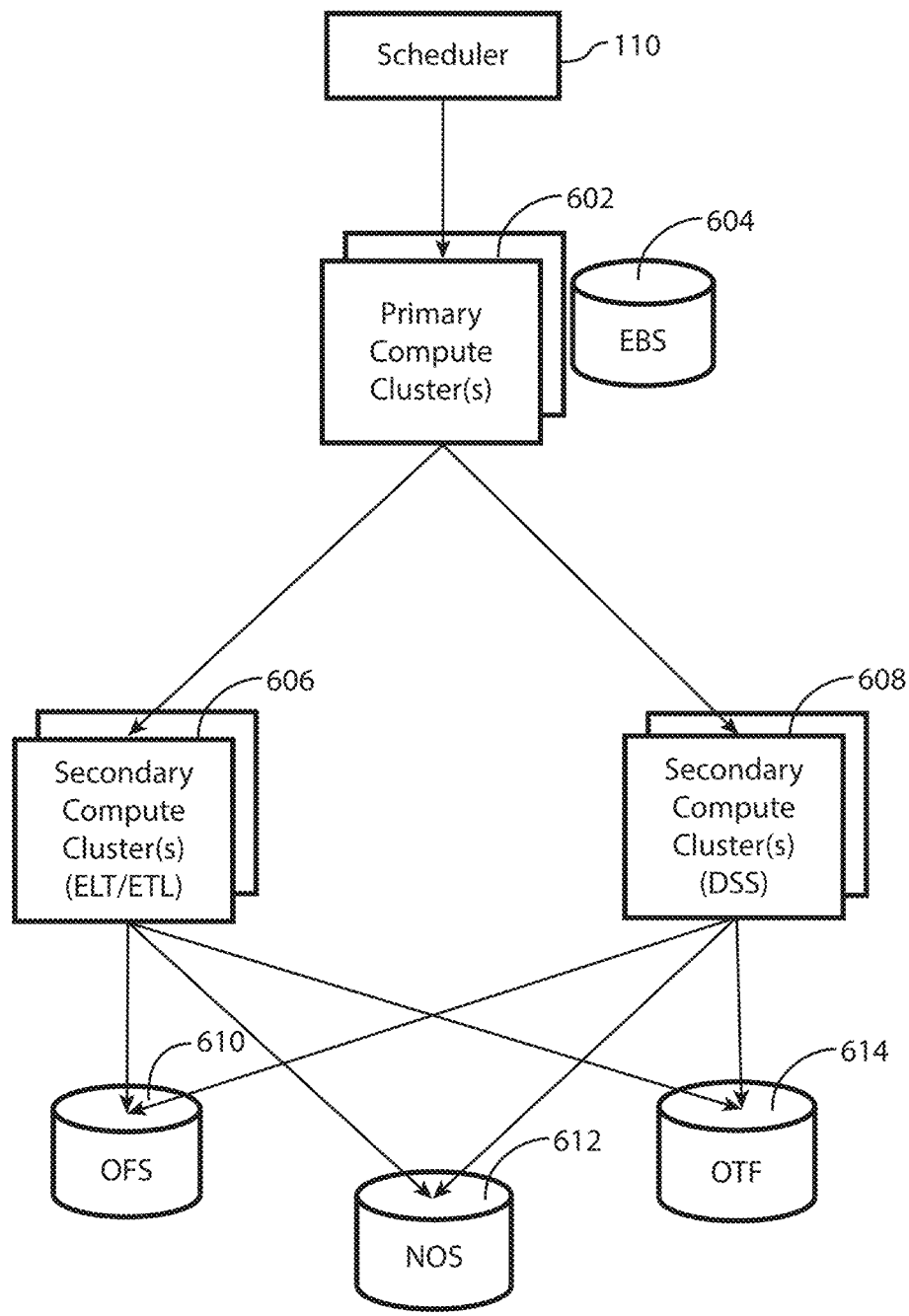
FIG. 6 is an illustration of an example architecture of a cloud-based enterprise data warehouse (CBEDW).

FIG. 6 is an illustration of an example architecture of an CBEDW. The example CBEDW architecture provides the computing resources needed to process the enterprise's normal day-to-day processing load. Typically, such a day-to-day processing load includes tactical workloads, which may be handled by the Primary Compute Cluster(s) 602, while more complex queries may be routed to the Secondary Compute Cluster(s) 606, 608. The example shown in FIG. 6 is a typical block diagram of a CloudLake tenant in a VantageCloud Lake™ database environment provided by Teradata Corporation.

The major components of the CloudLake tenant in the VantageCloud Lake™ database environment, which is a special case of the cloud-based processing system illustrated in FIG. 4, include:
- Primary Compute Cluster(s) 602, which forms the hub of the system environment housed on a cluster such as that illustrated in FIG. 5 and provides much of the functionality illustrated in FIGS. 1-3, i.e., acting as a "brain" to maintain persistent user data, to receive queries or query steps from the scheduler 110 (note the scheduler 110 may not be part of the CloudLake tenant), to distribute query processing to Secondary Compute Cluster(s) 606, 608 (discussed below), and to perform its own database processing, especially for tactical queries based off local storage 604, sometimes referred to as Elastic Block Storage (EBS), that have time-based service level agreements (SLAs); the Primary Compute Cluster(s) 602 is housed on a compute cluster such as illustrated in FIG. 5
- optional Secondary Compute Cluster(s) 606, 608, which are independent compute resources used to offload compute-intensive query steps from the Primary Compute Cluster(s) 602, that are scalable and can come and go as load varies; some Secondary Compute Cluster(s) 606 may be primarily devoted to export, load, transform/export, transform, load (ELT/ETL) workloads and some of the Secondary Compute Cluster(s) 608 may be primarily devoted to Decision Support (DSS) workloads; each of the Secondary Compute Cluster(s) 606, 608 is housed on a compute cluster such as illustrated in FIG. 5,
- Object Stores including Object File System (OFS) 610, Native Object System (NOS) 612, and Open Table Format (OTF) 614. The OFS 610 stores and manages data in an unstructured format called objects. Modern organizations create and analyze large volumes of unstructured data such as photos, videos, email, web pages, sensor data, and audio files. Cloud object storage systems distribute this data across multiple physical devices but allow users to access the content efficiently from a single, virtual storage repository. Object storage solutions are ideal for building cloud native applications that require scale and flexibility and can also be used to import existing data stores for analytics, backup, or archive. The NOS 612 is a Teradata Vantage feature that allows querying data stored in files in object storage such as AWS S3, Google GCS, Azure Blob without building a data pipeline to bring it into Vantage. OTF 614 overlays a table format on groups of files in a data lake, allowing those groups to be treated as a single table.
- a parallel, scalable network connection, represented by the lines between the elements in FIG. 6, that provides connectivity among the Primary Compute Cluster(s) 602, the Secondary Compute Cluster(s) 606, 608 and OFS 610, NOS 612, and/or OTF 614.

Example "Departmentalized" CBEDW Architecture

Figure 7:
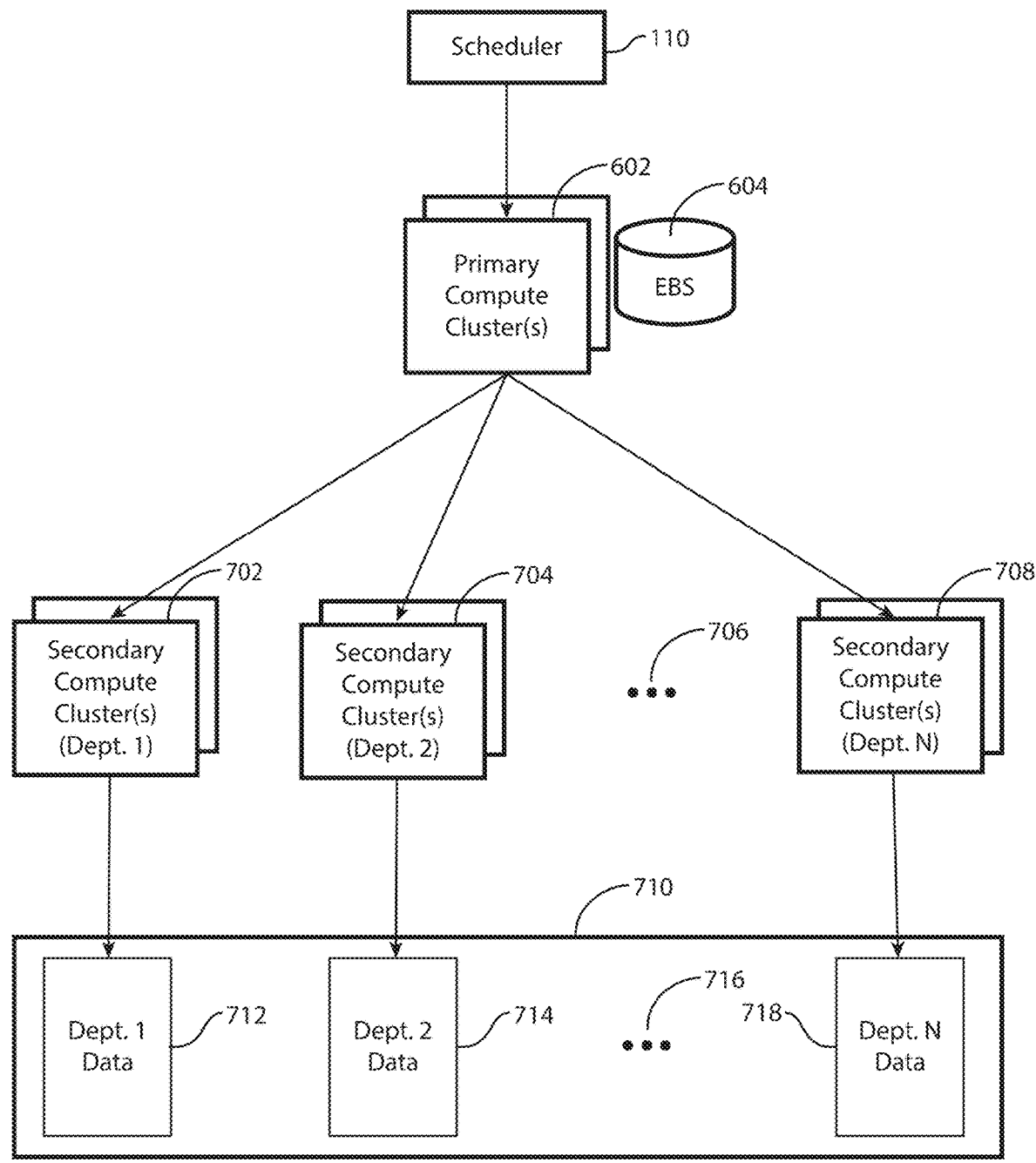
FIG. 7 illustrates an example of a "Departmentalized" CBEDW.

FIG. 7 illustrates an example of a "Departmentalized" CBEDW. The example is similar to that shown in FIG. 6. The scheduler 110 interfaces with one or more primary compute cluster(s) 602 which has access to the EBS 604. The primary compute cluster(s) 602 interface with a plurality of secondary compute cluster(s). In this example, one or more secondary compute cluster(s) 702 are assigned to department 1, one or more secondary compute cluster(s) 704 are assigned to department 2, and so on (indicated by ellipsis 706), through one or more secondary compute cluster(s) 708 being assigned to department N. The number of departments, N, is arbitrary and should not be considered limiting.

In FIG. 7, the company's (or enterprise's) data, including the OFS 610, NOS 612, OTF 614, and any other data owned by the company, is represented by a single block 710. Each department, i.e., department 1 702, department 2 704, through department N 708, is assigned its own share of the company's data 710. That is department 1 702 is assigned department 1 data 712, department 2 704 is assigned department 2 data 714, and so on (indicated by ellipsis 716), through department N 718 being assigned department N data 718. In this example, the assignments can be exclusive. That is each department may have exclusive access to its respective data. In other cases, the data owned, or portions of the data owned, by a department may be accessible by other departments.

The techniques described herein utilize the capability of the different compute clusters "owned" (or controlled) by different departments, i.e. secondary computer clusters 702, 704, 706, and 708, to allow individual queries and/or individual step(s) thereof, as generated by the scheduler 110, to be directed appropriately based upon characteristics of the query and the data acquisition step(s) and analytics step(s) that are required to satisfy the needs of the originating department while limiting usage of the resources or capacity "owned" by other departments.

The techniques utilize the intrinsic value of the CBEDW in that it provides a single common view of all the data (i.e. company data 710) that represents an individual business. As a result, multiple EAs may sit on top of the same CBEDW, being used for different but possibly related activities within the business.

Figure 8:
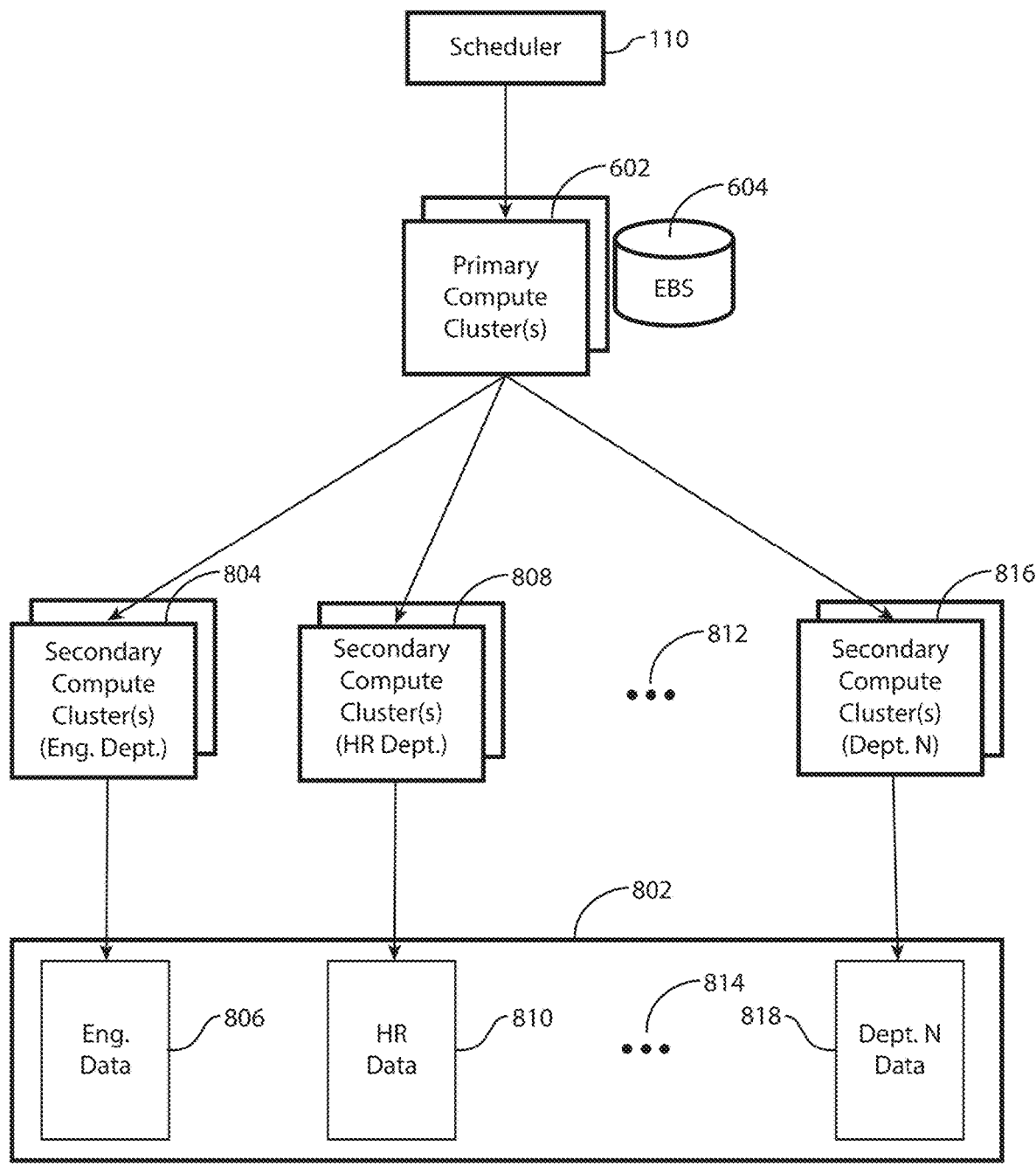
FIG. 8 illustrates an example CBEDW for an engineering company.

FIG. 8 illustrates an example CBEDW for an engineering company. In this example, an engineering company has company data 802 and at least two departments: Engineering, assigned secondary compute cluster(s) 804 and Engineering Data 806, and Human Resources (HR), assigned secondary compute cluster(s) 808 and HR data 810). The company will likely have other departments such as Sales/Marketing, Finance, Inventory Control, Distribution, etc., some of which may be assigned secondary compute clusters, symbolized by ellipsis 812, and data, symbolized by ellipsis 814, up to department N, assigned secondary compute cluster 816 and department N data 818. The various departments within the engineering company may be charged for their respective secondary compute clusters and data and, as a result, may guard use of those resources.

While the Engineering and HR departments typically operate independently (employing their respective compute clusters 804 and 808), there will be occasions where, for example, it would be useful for HR to access Engineering Data 806, such as the number of engineers and their associated effort levels and costs that could be applied to a given Engineering project, such as, for example, a head count needed for a project. In this example, the HR department may not have access to the Engineering data 806 it needs for these efforts.

Further, the Engineering department may not want their secondary compute clusters 804 or data 806 used for this purpose, particularly if the data acquisition step(s) is/are extensive and/or the analytic process step(s) is/are complex and likely to consume resources owned and paid for by them.

The techniques described herein provide a mechanism by which an individual department (e.g., the HR department in the example illustrated in FIG. 8) can gain access to data owned by another department (e.g., the Engineering department) to complete their analytics with the minimum of impact on the compute capability (and the Service Level Agreement-SLA, costs) of the Engineering department by analyzing incoming queries and separating out the data acquisition (query predicates and associated IO) components that may apply to the data of the Engineering department while processing an encompassing analytic that uses data extracted from the Engineering department on behalf of the HR department. The techniques include optimizer/workload management rules that can either return SQL text and/or optimized steps to the HR department processes such that it takes over the whole data acquisition step(s) and analytic process step(s) (at the cost of its resources) or, in order to address efficiency or security concerns, have the Engineering department acquire/sanitize the data to a spool (or shared storage) that the HR processes/step(s) can subsequently process.

Figure 9:
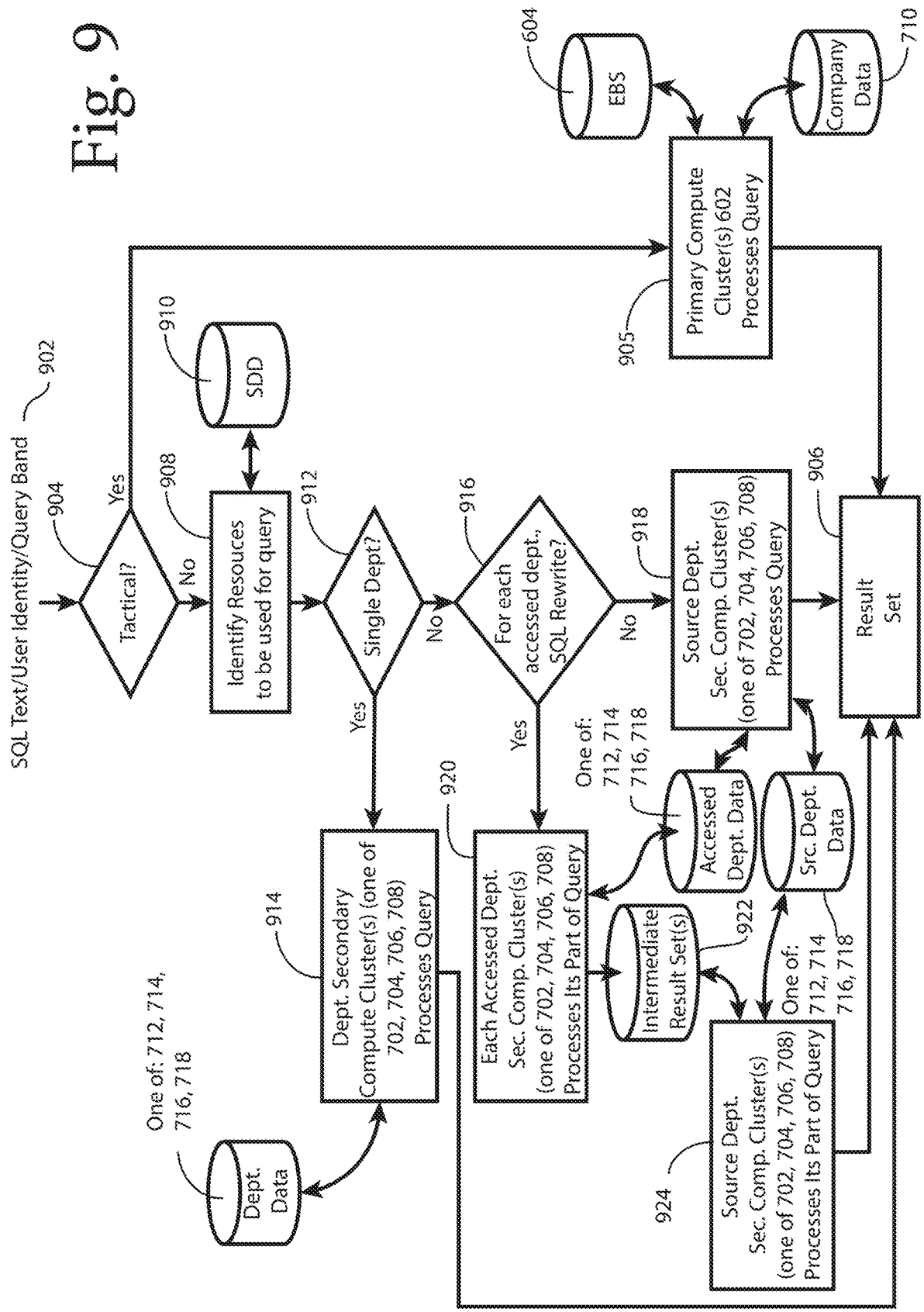
FIG. 9 illustrates an example query routing flow.

FIG. 9 illustrates an example query routing flow. The flow is initiated when a query 902 is received by the CBEDW. The query 902 may consist of SQL text. The connection associated with the SQL text will identify the user that issued the query, and/or a query band statement that includes parameters, in the form of key/value pairs, about the query, that may be used to identify the source of the query.

After performing the query intake processing illustrated in FIGS. 1-3, the database system's optimizer 320 may first determine if the query is tactical (block 904), defined, for the purposes of this disclosure, as queries that are short, highly tuned, and focused on more operational decision-making such as Call Center or Web Applications. The determination of whether or not the query is tactical is made by optimizer 320 examining the SQL text to see if it satisfies this description. In addition, queries from certain users or queries that fit into specific query bands may be determined by the optimizer 320 to be tactical. If the query is found to be tactical ("Yes" branch from block 904), the optimizer 320 may issue executable steps through the scheduler 110 to the primary compute cluster(s) 602 for processing (block 905). The primary compute cluster(s) 602 may access the EBS 604 and/or the company data 710, 802. The result of the processing is a result set 906.

If the query is not tactical ("No" branch from block 904), the optimizer 320 may determine if the query requires access to the data of multiple departments and/or the use of the secondary compute clusters of multiple departments. The optimizer 320 does this by first identifying the resources to be used for the query (block 908). In making this identification, the optimizer 320 considers numerous factors. For example, as mentioned above, the query 902 may include a user identity. The user identity may specify the department that originated the query 902. Alternatively, the optimizer 320 may have access to an index that can be used to look up the department with which the user identity is associated. In addition, as mentioned above, the query 902 may include query band information that may include a key/value pair that identifies the source department of the query. Further, the optimizer 320 may use a mapping tool that takes a departmental employee records table and maps it to an employee table that includes all employees in all departments so queries could be rewritten into a department-specific form (the selection/projection/joins essentially would be the same; the table/column names would be remapped, once as a Professional Service exercise) even if only the name of the employee that submitted the query is known. The optimizer 320 identifies the department that originated the query as the "source department" and includes the source department secondary compute processing and source department data as resources to be used in processing the query.

The optimizer 320 may also examine the SQL text to identify table (or relation) names to determine ownership of the tables needed to execute the query. Such tables are referred to herein as "query-recited tables." Table names, by themselves, can be problematic as they are only as good as a fixed schema that identifies "ownership." In [1], which is assigned to the assignee of this application and which is incorporated in its entirety by reference, the table ownership identification process operated at the EA level, rather than at the CBEDW level being discussed herein.

In this disclosure, unlike the approach described in [1], the identification of resources is pushed down into the CBEDW's database system. The advantage of this is that the database system has numerous tools that maintain the integrity of, for example, table names, column names, type definitions, schemas, etc. A "Secondary Data Dictionary" (SDD) 910 provides a mapping between CBEDW tables and departments (e.g., table X belongs to department Y). The SDD 910 may also include restrictions, such as row level security (RLS) and user defined function (UDF) permissions (some UDFs require licenses to execute and the licenses may be limited to, for example, a node), under which departments may identify rows and fields within tables that are not to be accessible under any circumstances by departments other than specified departments, including but not limited to the owner department. The SDD 910 may also include the ability to restrict access to departmental hardware, such as graphical processing units (GPUs). The SDD 910 may be represented in an internally consistent manner (i.e., the same rules apply to all tables in the CBEDW) that is usable by the optimizer 320 to optimize the execution of the query. This internal consistency may go beyond Logical Industrial Data Models, which sometimes get "modified" when they become physical data definition language (DDL) to map to individual business standards such as CamelCase, Hyphenated-Names, Underscored_Names.

Once the optimizer 320 has identified the resources to be used in processing the query and the departments that own those resources, the optimizer 320 will consider if the resources to be used to process the query are owned by a single department (block 912). If only a single department's resources are to be used ("Yes" branch from block 912), the optimizer 320 issues executable steps through the scheduler 110 to the resource-owning department's secondary compute clusters, i.e., one of 702, 704, 706, 708 in FIG. 7, which processes the query using departmental data, i.e., one of 712, 714, 716, 718, and produces a result set 906 (block 914). Note that if the originator of the query is not in the resource-owning department, the resource-owning department may reject the query or it may restrict processing the query to a particular time of day when the resources are less used or the resource-owning department may restrict access to the resource-owning department data per the restrictions described above. This is unlikely to happen, however, because if the originator or the query is not in the resource-owning department, the query would likely be identified as using the resources of more than one department and the flow would follow the "No" branch from block 912, rather than the "Yes" branch.

If the resources to be used to process the query are not owned by a single department ("No" branch from block 912), the optimizer 320 decides between two strategies for processing the query (block 916). The optimizer 320 makes this determination for each department having resources to be used in processing the query, which are referred to as the one or more "accessed department(s)". As mentioned earlier, the department that originated the query is referred to as the "source department."

If the optimizer 320 chooses the first strategy, referred to as the "SQL rewrite" strategy (the "Yes" branch from block 916), the optimizer 320 rewrites the query to have an accessed-department sub-query to be performed using the resources controlled by the accessed department to produce an accessed-department intermediate result set 922, which may be stored in a spool or other storage accessible to both the accessed department and the source department, and a source-department sub-query to be performed using the resources controlled by the source department to incorporate the accessed-department intermediate result 922 into the query result set 906. The optimizer 320 then issues executable steps through the scheduler 110 to the accessed department's secondary compute cluster(s), i.e., one of 702, 704, 706, 708, to perform the data acquisition and analytic steps to perform the accessed-department sub-query (block 920) and produce an accessed-department intermediate result 922 and to the source department's secondary compute cluster(s) to perform the data acquisition and analytic steps to produce a result set 906 that will incorporate the intermediate result set 922 (block 924). Note that the source department's (block 924) processing may not be performed until all the accessed departments have done their processing and all the intermediate result sets 922 are available. The accessed department's processing may include sanitizing the intermediate result set 922 before giving the source department access if, for example, the intermediate result set 922 includes confidential data or data protected by a license.

For example, consider the following query submitted by the HR department:
  SELECT*FROM (SELECT "gender", AVG ("income")
    AS "avg_income" FROM "ENG.employees") GROUP
    BY "gender" WHERE "gender"="F";

In this example, the ENG.employees table is owned by the engineering department. If the SQL rewrite strategy is chosen, for example because the ENG.employees table includes information the engineering department considers confidential, the HR query might be written as the following query to be submitted to the engineering department:
  SELECT "gender", AVG ("income" AS "avg_income"
    FROM "ENG.employees"
which would result in the "avg_income" table as the intermediate result set, accessible to both the engineering department and the HR department.

The following query would then be submitted to the HR department to produce the result set:
  SELECT*FROM avg_income GROUP BY "gender"
    WHERE "gender"="F";

Once all the accessed departments have been processed, the optimizer 320 issues executable steps through the scheduler 110 to the source department's secondary compute cluster(s) (i.e., one of 702, 704, 706, 708 in FIG. 7) to gather the data from the various accessed departments (i.e., one of 712, 714, 716, 718 in FIG. 7) stored in the intermediate result set(s) 922 and process it per the analytics specified in the query, and produce a result set 906 (block 924).

If the optimizer 320 chooses the second strategy, referred to as the "non-SQL rewrite" strategy (the "No" branch from block 916), the optimizer 320 creates and issues SQL text or executable steps to the source department's secondary compute cluster(s) (i.e., one of 702, 704, 706, 708 in FIG. 7) to perform the data acquisition and analytic steps for an accessed department 918. That is, in the non-SQL rewrite strategy, the source department's secondary compute cluster(s) has the ability to access data owned by the accessed department(s) required to execute the query.

The optimizer 320 makes the decision between the two strategies for each accessed department by generating query execution plans for the two strategies. Rather than using a solely "cost based" mechanism (typically looking for the least central processing unit (CPU)/input/output (IO) cost across a homogeneous CBEDW), the optimizer 320 takes into account the heterogenous environment of the CBEDW described herein where "costs" like "thresholds", "access-RLS" and/or capability (UDF Licenses) are included in the decision-making process. That is, traditional costs are still a consideration in deciding which strategy to use but additional cost dimensions are considered that arise from the departmental division of the secondary compute processing and data. One of the additional costs for the SQL-rewrite strategy may be the need to join the data in the intermediate result set 922 with additional data accessed by the one or more secondary compute clusters controlled by the source department. Some of the costs of the non-SQL rewrite strategy, such as if access to needed data is prohibited or limited, may completely eliminate the non-SQL rewrite strategy from consideration.

Note that for the same query involving multiple accessed departments, some of the accessed departments may be processed under the SQL rewrite strategy and others of the accessed department may be processed under the non-SQL rewrite strategy. In that case, the source department's processing of its part of the query (block 924) may wait until all of the accessed departments processed under the SQL rewrite strategy have produced their intermediate result set(s) 922. At that point, the source department's secondary compute cluster(s) will have access to all the data required to produce a final result set 906 in the intermediate result set(s) 922 for departments processed under the SQL rewrite strategy or in the accessed departments' data, i.e., one of 712, 714, 716, 718 (note that, for simplicity of presentation, the connection between block 924 and the accessed departments' data is not shown in FIG. 9).

Consider, as an example, the engineering company illustrated in FIG. 8. Assume that the query being processed by the CBEDW originates from the HR department and includes accessing a table owned by the engineering department that has RLS and/or UDF restrictions. In that case, the optimizer 320 may select the "SQL rewrite" strategy and issue SQL text or executable steps through the scheduler 110 to the engineering department's secondary compute cluster(s) 804 to perform the part of the query directed to the engineering department, returning a result, after sanitizing it, if necessary, to address the RLS and/or UDF restrictions and save it in a memory accessible to both the Engineering department's secondary compute cluster(s) 804 and the HR department's secondary compute cluster(s) 804. The HR department's secondary compute cluster(s) 804 can then complete the analysis required by the query.

In another example, assume the same conditions as in the previous example except that the engineering department table does not have RLS and/or UDF restrictions. In that case, the optimizer 320 may determine that the "non-SQL rewrite" approach is the more efficient approach and issue SQL text or executable steps through the scheduler 110 to the HR department's secondary compute cluster(s) 808. The HR department's secondary compute cluster(s) can then perform the analysis required by the query.

Clause 1. A method comprising:
executing, by a plurality of compute groups, a cloud based enterprise data warehouse (CBEDW) for an enterprise as a plurality of processes,
  wherein at least one of the compute groups is cloud based,
  wherein each compute group comprises one or more compute clusters, including a primary compute cluster and a plurality of secondary compute clusters,
  wherein each compute cluster comprises one or more nodes,
  wherein each node comprises at least one computer processor and a memory,
  wherein the plurality of processes stores data on a data storage,
  wherein at least a portion of the data storage is cloud based,
  wherein the enterprise comprises a plurality of departments,
  wherein at least some of the plurality of departments has control of a respective one or more the plurality of secondary compute clusters,
  wherein the data storage is segmented into departmental portions and wherein at least some of the plurality of departments that have control of one or more of the plurality of secondary compute clusters has control of a respective departmental portion of the data storage, and
executing, by at least one of the plurality of processes, a database system;
receiving a query by the database system, wherein the query recites one or more query-recited tables, wherein each of the query-recited tables is stored in a respective departmental portion of the data storage;
analyzing the query by the database system to determine the resources required to execute the query by:
  identifying the department that issued the query (the "source department") and identifying the one or more secondary compute clusters controlled by the source department as a resource required to execute the query;
  identifying the query-recited tables and determining the department by which each of the query-recited tables is controlled by:
    accessing a database-level data dictionary that identifies tables in the database system, which department controls each table, and which departments have access to each table,
    identifying the departmental portion of the data storage for each department that controls a query-recited table as a resource required to execute the query, and
    identifying the secondary compute clusters controlled by each department that controls a query-recited table as a resource required to execute the query;
determining, by the database system, that the resources required to execute the query are controlled by more than one department: the source department and one or more accessed departments;
for each accessed department:
  determining, by the database system, a first-strategy cost of a first strategy for processing the accessed department's portion of the query, wherein in the first strategy the query is re-written to have an accessed-department sub-query to be performed using the resources controlled by the accessed department to produce an accessed-department intermediate result set and a source-department sub-query to be performed using the resources controlled by the source department to incorporate the accessed-department intermediate result into a query result set, and determining, by the database system, a second-strategy cost of a second strategy for processing the accessed department's portion of the query, wherein in the second strategy the query is executed by the one or more secondary compute clusters controlled by the source department to produce the query result set, wherein determining the cost includes:

preparing, by the database system, a query execution plan, determining the cost of the resources, and considering whether data controlled by the accessed department is not accessible except to the accessed department;

for at least one of the accessed departments, choosing, by the database system, the first strategy because the first-strategy cost is lower than the second-strategy cost, and for the accessed departments for which the first strategy was chosen, processing a portion of the query to be performed using resources controlled by the accessed department using the chosen first strategy to produce the accessed-department intermediate result set;

processing the query, by the secondary compute cluster controlled by the source department, the query incorporating the one or more accessed-department intermediate result sets from the one or more accessed departments, to produce a result set.

Clause 2. The method of clause 1 further comprising determining, by the database system, that the query is not a tactical query.

Clause 3. The method of any of the preceding clauses wherein determining the first-strategy cost of the first strategy for processing the accessed department's portion of the query includes:

sanitizing the accessed-department intermediate result set, by the secondary compute cluster controlled by the accessed department, by excluding data the accessed department protects from disclosure.

Clause 4. The method of any of the preceding clauses wherein determining the cost by the database system includes determining, by an optimizer executing on at least one of the plurality of processes, the first-strategy cost and the second-strategy cost.

Clause 5. The method of any of the preceding clauses wherein considering whether data controlled by the accessed department is not accessible except to the accessed department includes determining whether data controlled by the accessed department includes one or more of row level security restrictions, and user defined function permission restrictions.

Clause 6. The method of any of the preceding clauses wherein determining the cost may further include considering whether access to the accessed department's secondary compute clusters is restricted.

Clause 7. The method of any of the preceding clauses wherein, in the second strategy, the one or more secondary compute clusters controlled by the source department access a departmental portion of the data storage department controlled by the accessed department.

Clause 8. A non-transitory computer-readable tangible medium, on which is recorded a computer program, the computer program comprising executable instructions, that, when executed, perform a method comprising:

executing, by a plurality of compute groups, a cloud based enterprise data warehouse (CBEDW) for an enterprise as a plurality of processes, wherein at least one of the compute groups is cloud based, wherein each compute group comprises one or more compute clusters, including a primary compute cluster and a plurality of secondary compute clusters, wherein each compute cluster comprises one or more nodes, wherein each node comprises at least one computer processor and a memory, wherein the plurality of processes stores data on a data storage, wherein at least a portion of the data storage is cloud based, wherein the enterprise comprises a plurality of departments, wherein at least some of the plurality of departments has control of a respective one or more the plurality of secondary compute clusters, wherein the data storage is segmented into departmental portions and wherein at least some of the plurality of departments that have control of one or more of the plurality of secondary compute clusters has control of a respective departmental portion of the data storage, and executing, by at least one of the plurality of processes, a database system;

receiving a query by the database system, wherein the query recites one or more query-recited tables, wherein each of the query-recited tables is stored in a respective departmental portion of the data storage;

analyzing the query by the database system to determine the resources required to execute the query by:

identifying the department that issued the query (the "source department") and identifying the one or more secondary compute clusters controlled by the source department as a resource required to execute the query;

identifying the query-recited tables and determining the department by which each of the query-recited tables is controlled by:

accessing a database-level data dictionary that identifies tables in the database system, which department controls each table, and which departments have access to each table, identifying the departmental portion of the data storage for each department that controls a query-recited table as a resource required to execute the query, and identifying the secondary compute clusters controlled by each department that controls a query-recited table as a resource required to execute the query;

determining, by the database system, that the resources required to execute the query are controlled by more than one department: the source department and one or more accessed departments;

for each accessed department:

determining, by the database system, a first-strategy cost of a first strategy for processing the accessed department's portion of the query, wherein in the first strategy the query is re-written to have an accessed-department sub-query to be performed using the resources controlled by the accessed department to produce an accessed-department intermediate result set and a source-department sub-query to be performed using the resources controlled by the source department to incorporate the accessed-department intermediate result into a query result set, and determining, by the database system, a second-strategy cost of a second strategy for processing the accessed department's portion of the query, wherein in the second strategy the query is executed by the one or more secondary compute clusters controlled by the source department to produce the query result set, wherein determining the cost includes:
preparing, by the database system, a query execution plan,
determining the cost of the resources, and
considering whether data controlled by the accessed department is not accessible except to the accessed department;
for at least one of the accessed departments, choosing, by the database system, the first strategy because the first-strategy cost is lower than the second-strategy cost, and
for the accessed departments for which the first strategy was chosen, processing a portion of the query to be performed using resources controlled by the accessed department using the chosen first strategy to produce the accessed-department intermediate result set;
processing the query, by the secondary compute cluster controlled by the source department, the query incorporating the one or more accessed-department intermediate result sets from the one or more accessed departments, to produce a result set.

Clause 9. The non-transitory computer-readable tangible medium of clause 8 wherein the method further comprises determining, by the database system, that the query is not a tactical query.

Clause 10. The non-transitory computer-readable tangible medium of any of clauses 8 and 9 wherein determining the first-strategy cost of the first strategy for processing the accessed department's portion of the query includes:
sanitizing the accessed-department intermediate result set, by the secondary compute cluster controlled by the accessed department, by excluding data the accessed department protects from disclosure.

Clause 11. The non-transitory computer-readable tangible medium of any of clauses 8-10 wherein determining the cost by the database system includes determining, by an optimizer executing on at least one of the plurality of processes, the first-strategy cost and the second-strategy cost.

Clause 12. The non-transitory computer-readable tangible medium of clauses 8-11 wherein considering whether data controlled by the accessed department is not accessible except to the accessed department includes determining whether data controlled by the accessed department includes one or more of row level security restrictions, and user defined function permission restrictions.

Clause 13. The non-transitory computer-readable tangible medium of clauses 8-12 wherein determining the cost may further include considering whether access to the accessed department's secondary compute clusters is restricted.

Clause 14. The non-transitory computer-readable tangible medium of clauses 8-13 wherein, in the second strategy, the one or more secondary compute clusters controlled by the source department access a departmental portion of the data storage department controlled by the accessed department.

Clause 15. A system comprising:
a plurality of compute groups executing a cloud based enterprise data warehouse (CBEDW) for an enterprise as a plurality of processes,
wherein at least one of the compute groups is cloud based,
wherein each compute group comprises one or more compute clusters, including a primary compute cluster and a plurality of secondary compute clusters,
wherein each compute cluster comprises one or more nodes,
wherein each node comprises at least one computer processor and a memory,
wherein the plurality of processes stores data on a data storage,
wherein at least a portion of the data storage is cloud based,
wherein the enterprise comprises a plurality of departments,
wherein at least some of the plurality of departments has control of a respective one or more the plurality of secondary compute clusters,
wherein the data storage is segmented into departmental portions and wherein at least some of the plurality of departments that have control of one or more of the plurality of secondary compute clusters has control of a respective departmental portion of the data storage, and
the CBEDW executing, by at least one of the plurality of processes, a database system;
the database system receiving a query, wherein the query recites one or more query-recited tables, wherein each of the query-recited tables is stored in a respective departmental portion of the data storage;
the database system analyzing the query to determine the resources required to execute the query by:
identifying the department that issued the query (the "source department") and identifying the one or more secondary compute clusters controlled by the source department as a resource required to execute the query;
identifying the query-recited tables and determining the department by which each of the query-recited tables is controlled by:
accessing a database-level data dictionary that identifies tables in the database system, which department controls each table, and which departments have access to each table,
identifying the departmental portion of the data storage for each department that controls a query-recited table as a resource required to execute the query, and
identifying the secondary compute clusters controlled by each department that controls a query-recited table as a resource required to execute the query;
the database system determining that the resources required to execute the query are controlled by more than one department: the source department and one or more accessed departments;
for each accessed department:
the database system determining a first-strategy cost of a first strategy for processing the accessed department's portion of the query, wherein in the first strategy the query is re-written to have an accessed-department sub-query to be performed using the resources controlled by the accessed department to produce an accessed-department intermediate result set and a source-department sub-query to be performed using the resources controlled by the source department to incorporate the accessed-department intermediate result into a query result set, and the database system determining, a second-strategy cost of a second strategy for processing the accessed department's portion of the query, wherein in the second strategy the query is executed by the one or more secondary compute clusters controlled by the source department to produce the query result set, wherein determining the cost includes:

preparing, by the database system, a query execution plan, determining the cost of the resources, and considering whether data controlled by the accessed department is not accessible except to the accessed department;

the database system choosing, for at least one of the accessed departments, the first strategy because the first-strategy cost is lower than the second-strategy cost, and the database system processing, for the accessed departments for which the first strategy was chosen, a portion of the query to be performed using resources controlled by the accessed department using the chosen first strategy to produce the accessed-department intermediate result set;

the secondary compute cluster controlled by the source department processing the query, incorporating the one or more accessed-department intermediate result sets from the one or more accessed departments, to produce a result set.

Clause 16. The system of clause 15 wherein the database system determines that the query is not a tactical query.

Clause 17. The system of any of clauses 15-16 wherein determining the first-strategy cost of the first strategy for processing the accessed department's portion of the query includes:

the secondary compute cluster controlled by the accessed department sanitizing the accessed-department intermediate result set by excluding data the accessed department protects from disclosure.

Clause 18. The system of any of clauses 15-17 wherein determining the cost by the database system includes determining, by an optimizer executing on at least one of the plurality of processes, the first-strategy cost and the second-strategy cost.

Clause 19. The system of any of clauses 15-18 wherein considering whether data controlled by the accessed department is not accessible except to the accessed department includes the database system determining whether data controlled by the accessed department includes one or more of row level security restrictions, and user defined function permission restrictions.

Clause 20. The system of any of clauses 15-19 wherein determining the cost may further include considering whether access to the accessed department's secondary compute clusters is restricted.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[1] U.S. Pat. No. 9,805,121 B2

What is claimed is:

1. A method comprising:

executing, by a plurality of compute groups, a cloud based enterprise data warehouse (CBEDW) for an enterprise as a plurality of processes, wherein at least one of the compute groups is cloud based, wherein each compute group comprises one or more compute clusters, including a primary compute cluster and a plurality of secondary compute clusters, wherein each compute cluster comprises one or more nodes, wherein each node comprises at least one computer processor and a memory, wherein the plurality of processes stores data on a data storage, wherein at least a portion of the data storage is cloud based, wherein the enterprise comprises a plurality of departments, wherein at least some of the plurality of departments has control of a respective one or more the plurality of secondary compute clusters, wherein the data storage is segmented into departmental portions and wherein at least some of the plurality of departments that have control of one or more of the plurality of secondary compute clusters has control of a respective departmental portion of the data storage, and executing, by at least one of the plurality of processes, a database system;

receiving a query by the database system, wherein the query recites one or more query-recited tables, wherein each of the query-recited tables is stored in a respective departmental portion of the data storage;

analyzing the query by the database system to determine the resources required to execute the query by:

identifying the department that issued the query (the "source department") and identifying the one or more secondary compute clusters controlled by the source department as a resource required to execute the query;

identifying the query-recited tables and determining the department by which each of the query-recited tables is controlled by:

accessing a database-level data dictionary that identifies tables in the database system, which department controls each table, and which departments have access to each table, identifying the departmental portion of the data storage for each department that controls a query-recited table as a resource required to execute the query, and identifying the secondary compute clusters controlled by each department that controls a query-recited table as a resource required to execute the query;

determining, by the database system, that the resources required to execute the query are controlled by more than one department: the source department and one or more accessed departments;

for each accessed department:

determining, by the database system, a first-strategy cost of a first strategy for processing the accessed department's portion of the query, wherein in the first strategy the query is re-written to have an accessed-department sub-query to be performed using the resources controlled by the accessed department to produce an accessed-department intermediate result set and a source-department sub-query to be performed using the resources controlled by the source department to incorporate the accessed-department intermediate result into a query result set, and determining, by the database system, a second-strategy cost of a second strategy for processing the accessed department's portion of the query, wherein in the second strategy the query is executed by the one or more secondary compute clusters controlled by the source department to produce the query result set, wherein determining the cost includes:

preparing, by the database system, a query execution plan, determining the cost of the resources, and considering whether data controlled by the accessed department is not accessible except to the accessed department;

for at least one of the accessed departments, choosing, by the database system, the first strategy because the first-strategy cost is lower than the second-strategy cost, and for the accessed departments for which the first strategy was chosen, processing a portion of the query to be performed using resources controlled by the accessed department using the chosen first strategy to produce the accessed-department intermediate result set;

processing the query, by the secondary compute cluster controlled by the source department, the query incorporating the one or more accessed-department intermediate result sets from the one or more accessed departments, to produce a result set.

2. The method of claim 1 further comprising determining, by the database system, that the query is not a tactical query.

3. The method of claim 1 wherein determining the first-strategy cost of the first strategy for processing the accessed department's portion of the query includes:

sanitizing the accessed-department intermediate result set, by the secondary compute cluster controlled by the accessed department, by excluding data the accessed department protects from disclosure.

4. The method of claim 1 wherein determining the cost by the database system includes determining, by an optimizer executing on at least one of the plurality of processes, the first-strategy cost and the second-strategy cost.

5. The method of claim 1 wherein considering whether data controlled by the accessed department is not accessible except to the accessed department includes determining whether data controlled by the accessed department includes one or more of row level security restrictions, and user defined function permission restrictions.

6. The method of claim 1 wherein determining the cost may further include considering whether access to the accessed department's secondary compute clusters is restricted.

7. The method of claim 1 wherein, in the second strategy, the one or more secondary compute clusters controlled by the source department access a departmental portion of the data storage department controlled by the accessed department.

8. A non-transitory computer-readable tangible medium, on which is recorded a computer program, the computer program comprising executable instructions, that, when executed, perform a method comprising:

executing, by a plurality of compute groups, a cloud based enterprise data warehouse (CBEDW) for an enterprise as a plurality of processes, wherein at least one of the compute groups is cloud based, wherein each compute group comprises one or more compute clusters, including a primary compute cluster and a plurality of secondary compute clusters, wherein each compute cluster comprises one or more nodes, wherein each node comprises at least one computer processor and a memory, wherein the plurality of processes stores data on a data storage, wherein at least a portion of the data storage is cloud based, wherein the enterprise comprises a plurality of departments, wherein at least some of the plurality of departments has control of a respective one or more the plurality of secondary compute clusters, wherein the data storage is segmented into departmental portions and wherein at least some of the plurality of departments that have control of one or more of the plurality of secondary compute clusters has control of a respective departmental portion of the data storage, and executing, by at least one of the plurality of processes, a database system;

receiving a query by the database system, wherein the query recites one or more query-recited tables, wherein each of the query-recited tables is stored in a respective departmental portion of the data storage;

analyzing the query by the database system to determine the resources required to execute the query by:

identifying the department that issued the query (the "source department") and identifying the one or more secondary compute clusters controlled by the source department as a resource required to execute the query;

identifying the query-recited tables and determining the department by which each of the query-recited tables is controlled by:

accessing a database-level data dictionary that identifies tables in the database system, which department controls each table, and which departments have access to each table, identifying the departmental portion of the data storage for each department that controls a query-recited table as a resource required to execute the query, and identifying the secondary compute clusters controlled by each department that controls a query-recited table as a resource required to execute the query;

determining, by the database system, that the resources required to execute the query are controlled by more than one department: the source department and one or more accessed departments;

for each accessed department:

determining, by the database system, a first-strategy cost of a first strategy for processing the accessed department's portion of the query, wherein in the first strategy the query is re-written to have an accessed-department sub-query to be performed using the resources controlled by the accessed department to produce an accessed-department intermediate result set and a source-department sub-query to be performed using the resources controlled by the source department to incorporate the accessed-department intermediate result into a query result set, and determining, by the database system, a second-strategy cost of a second strategy for processing the accessed department's portion of the query, wherein in the second strategy the query is executed by the one or more secondary compute clusters controlled by the source department to produce the query result set, wherein determining the cost includes:

preparing, by the database system, a query execution plan, determining the cost of the resources, and considering whether data controlled by the accessed department is not accessible except to the accessed department;

for at least one of the accessed departments, choosing, by the database system, the first strategy because the first-strategy cost is lower than the second-strategy cost, and for the accessed departments for which the first strategy was chosen, processing a portion of the query to be performed using resources controlled by the accessed department using the chosen first strategy to produce the accessed-department intermediate result set;

processing the query, by the secondary compute cluster controlled by the source department, the query incorporating the one or more accessed-department intermediate result sets from the one or more accessed departments, to produce a result set.

9. The non-transitory computer-readable tangible medium of claim 8 wherein the method further comprises determining, by the database system, that the query is not a tactical query.

10. The non-transitory computer-readable tangible medium of claim 8 wherein determining the first-strategy cost of the first strategy for processing the accessed department's portion of the query includes:

sanitizing the accessed-department intermediate result set, by the secondary compute cluster controlled by the accessed department, by excluding data the accessed department protects from disclosure.

11. The non-transitory computer-readable tangible medium of claim 8 wherein determining the cost by the database system includes determining, by an optimizer executing on at least one of the plurality of processes, the first-strategy cost and the second-strategy cost.

12. The non-transitory computer-readable tangible medium of claim 8 wherein considering whether data controlled by the accessed department is not accessible except to the accessed department includes determining whether data controlled by the accessed department includes one or more of row level security restrictions, and user defined function permission restrictions.

13. The non-transitory computer-readable tangible medium of claim 8 wherein determining the cost may further include considering whether access to the accessed department's secondary compute clusters is restricted.

14. The non-transitory computer-readable tangible medium of claim 8 wherein, in the second strategy, the one or more secondary compute clusters controlled by the source department access a departmental portion of the data storage department controlled by the accessed department.

15. A system comprising:

a plurality of compute groups executing a cloud based enterprise data warehouse (CBEDW) for an enterprise as a plurality of processes, wherein at least one of the compute groups is cloud based, wherein each compute group comprises one or more compute clusters, including a primary compute cluster and a plurality of secondary compute clusters, wherein each compute cluster comprises one or more nodes, wherein each node comprises at least one computer processor and a memory, wherein the plurality of processes stores data on a data storage, wherein at least a portion of the data storage is cloud based, wherein the enterprise comprises a plurality of departments, wherein at least some of the plurality of departments has control of a respective one or more the plurality of secondary compute clusters, wherein the data storage is segmented into departmental portions and wherein at least some of the plurality of departments that have control of one or more of the plurality of secondary compute clusters has control of a respective departmental portion of the data storage, and the CBEDW executing, by at least one of the plurality of processes, a database system;

the database system receiving a query, wherein the query recites one or more query-recited tables, wherein each of the query-recited tables is stored in a respective departmental portion of the data storage;

the database system analyzing the query to determine the resources required to execute the query by:

identifying the department that issued the query (the "source department") and identifying the one or more secondary compute clusters controlled by the source department as a resource required to execute the query;

identifying the query-recited tables and determining the department by which each of the query-recited tables is controlled by:

accessing a database-level data dictionary that identifies tables in the database system, which department controls each table, and which departments have access to each table, identifying the departmental portion of the data storage for each department that controls a query-recited table as a resource required to execute the query, and identifying the secondary compute clusters controlled by each department that controls a query-recited table as a resource required to execute the query;

the database system determining that the resources required to execute the query are controlled by more than one department: the source department and one or more accessed departments;

for each accessed department:

the database system determining a first-strategy cost of a first strategy for processing the accessed department's portion of the query, wherein in the first strategy the query is re-written to have an accessed-department sub-query to be performed using the resources controlled by the accessed department to produce an accessed-department intermediate result set and a source-department sub-query to be performed using the resources controlled by the source department to incorporate the accessed-department intermediate result into a query result set, and the database system determining, a second-strategy cost of a second strategy for processing the accessed department's portion of the query, wherein in the second strategy the query is executed by the one or more secondary compute clusters controlled by the source department to produce the query result set, wherein determining the cost includes:

preparing, by the database system, a query execution plan, determining the cost of the resources, and considering whether data controlled by the accessed department is not accessible except to the accessed department;

the database system choosing, for at least one of the accessed departments, the first strategy because the first-strategy cost is lower than the second-strategy cost, and the database system processing, for the accessed departments for which the first strategy was chosen, a portion of the query to be performed using resources controlled by the accessed department using the chosen first strategy to produce the accessed-department intermediate result set;

the secondary compute cluster controlled by the source department processing the query, incorporating the one or more accessed-department intermediate result sets from the one or more accessed departments, to produce a result set.

16. The system of claim 15 wherein the database system determines that the query is not a tactical query.

17. The system of claim 15 wherein determining the first-strategy cost of the first strategy for processing the accessed department's portion of the query includes:

the secondary compute cluster controlled by the accessed department sanitizing the accessed-department intermediate result set by excluding data the accessed department protects from disclosure.

18. The system of claim 15 wherein determining the cost by the database system includes determining, by an optimizer executing on at least one of the plurality of processes, the first-strategy cost and the second-strategy cost.

19. The system of claim 15 wherein considering whether data controlled by the accessed department is not accessible except to the accessed department includes the database system determining whether data controlled by the accessed department includes one or more of row level security restrictions, and user defined function permission restrictions.

20. The system of claim 15 wherein determining the cost may further include considering whether access to the accessed department's secondary compute clusters is restricted.

* * * * *